United States Patent [19]

Nimberger

[11] Patent Number: 4,556,196
[45] Date of Patent: Dec. 3, 1985

[54] METHOD AND APPARATUS FOR SEALING VALVE STEMS

[75] Inventor: Spencer M. Nimberger, Houston, Tex.

[73] Assignee: General Screw Products Company, Houston, Tex.

[21] Appl. No.: 563,961

[22] Filed: Dec. 21, 1983

[51] Int. Cl.$^4$ .................. F16K 31/44; F16J 15/34
[52] U.S. Cl. .................. 251/214; 251/223; 277/205; 277/93 SD
[58] Field of Search .......... 277/93 SD, 205; 251/223, 214

[56] References Cited

U.S. PATENT DOCUMENTS

| | | | |
|---|---|---|---|
| 1,363,378 | 12/1920 | Vuilleumer | 277/93 SD |
| 2,498,916 | 2/1950 | Espegren | 277/93 SD |
| 2,660,459 | 11/1953 | Collins | 277/205 |
| 2,705,177 | 3/1955 | Waring | 277/205 |
| 3,326,560 | 6/1967 | Trbovich | 277/205 |
| 4,061,157 | 12/1977 | Hanssen | 251/214 |
| 4,118,007 | 10/1978 | Scapes | 251/223 |

Primary Examiner—A. Michael Chambers
Attorney, Agent, or Firm—Carwell & Helmreich

[57] ABSTRACT

A valve is provided with an improved seal between the valve body and the rotatable valve stem. A high pressure fluid seal is formed by a pressure-responsive lip seal. A spring positioned between the lip seal and the valve stem sealing surface provides a substantially axially directed force to a metal O-ring, which biases the lip seal into sealing engagement with the valve body and stem under relatively low pressure.

20 Claims, 5 Drawing Figures

METHOD AND APPARATUS FOR SEALING VALVE STEMS

BACKGROUND OF THE INVENTION

The present invention concerns valves of the type having a rotatable valve stem passing through a valve body and having a sealing surface for engagement and disengagement with the valve seat. Such valves are commonly used in many industries, and one type of valve referred to as a control valve is illustrated in several embodiments in the brochure entitled "WKM CATALOG WHS-78" distributed by WKM Wellhead Systems, Inc. Many such valves are provided with a bonnet fixed to the valve body and adapted for receiving the rotatable valve stem, and for convenience in description are the type of valve generally referred to below.

More particularly, the present invention concerns the seal conventionally provided between the valve bonnet and rotatable valve stem, which seal prevents the escape of pressurized fluid from the valve body. Many such seals have been heretofore devised, and probably the most commonly used seal is formed from packing material which is placed between the valve stem and the bonnet. Although packing materials of various types generally provide an adequate seal, it is commonly known that periodic maintenance is generally required to maintain such a seal. Such maintenance may consist of tightening the packing glands or replacing the packing material, and such maintenance is costly both in terms of time and equipment downtime.

Other types of seals between the bonnet and stem have been devised, such as a lip seal having a generally U-shaped cross-sectional configuration. Fluid pressure between the lips or uprights of the U-shaped seal force the outer lip outwardly into engagement with the bonnet, and force the inner lip inwardly into engagement with the stem. Advantages of such a lip seal are that little or no maintenance is required, and the sealing force between the seal and the bonnet and stem increases as the fluid pressure in the valve increases.

A major problem with the use of lip seals between the bonnet and stem, however, concerns the ability of the seal to provide the desired sealing function under relatively low pressure over a long period of time. Such seals typically are formed from a non-corrosive plastic, such as Teflon®, which does not rapidly deteriorate when subjected to various fluids under a typical range of pressures and temperatures. When first installed, the lip seal material is sufficiently elastic to deformed under high fluid pressure for proper sealing engagement with the bonnet and stem, yet sufficiently resilient to return to its original configuration under relatively low pressure to maintain the desired sealing engagement. After being subjected to various pressure and temperature levels, however, satisfactory plastic lip seals tend to loose their resiliency, especially over time, and problems are encountered in maintaining the desired seal under low pressure.

One solution to the above problem with lip seals has been to provide a plastic lip seal with a metal leaf spring having a V-shaped cross-sectional configuration positioned between the inner and outer lips of the seal. Such a lip seal, referred to as a leaf spring energized seal, has been manufactured and sold by Polydyne Industries, Inc. in Denver, Colorado. Under relatively low fluid pressure, the leaf spring spaced between the inner and outer lips biases the outer lip into engagement with the bonnet, while the inner lip is biased into engagement with the stem. Under relatively high pressure, the effect of the leaf spring compared to the fluid pressure force is minimized, and the increased fluid pressure is a primary factor causing sealing engagement of the lips with the bonnet and stem.

The design of many valves is such, however, that there is very limited space between the bonnet and the stem, which tends to limit the use of leaf spring energized seals. Also, it should be understood that the manufacture and assembly of a leaf spring energized seal as described above, may be relatively costly, especially for low volume productions. The leaf spring energized seals described above have therefore not been commonly used on relatively small valves wherein little spacing is provided between the bonnet and the stem.

Further attempts have thus been made to provide an improved seal between the bonnet and the stem of the valve. In an attempt to retain the concept of the lip seal, various attempts have been made to devise a material for forming lip seals which has the desired sealing properties, including continued high resiliency with time over various pressure and temperature ranges. To date, however, such attempts have not been totally satisfactory. One such attempt has been to manufacture the lip seal from two different plastic materials: the first designed principally for ideal sealing purposes, and the second inner material to serve primarily as a continuous resilient material acting upon the outer material. This solution also has not been universally accepted, however, in part because the inner resilient material tends to deteriorate under adverse environmental conditions. The use of lip seals between the valve bonnet and valve stem has thus achieved limited success in the valve industry, and various other attempts have been made to provide the desired seal without utilizing the lip seal concept.

The disadvantages of the prior art are overcome by the present invention, and improved methods and apparatus are herein provided employing the lip seal concept to seal the space between the valve body and stem.

SUMMARY OF THE INVENTION

Improved method and apparatus are provided employing a lip seal for sealing the space between the valve body and stem. In an exemplary embodiment of the present invention, the end of the outer lip is biased outwardly by a spring spaced between the lip seal and the valve stem sealing surface, and the inner lip is similarly biased inwardly by the same spring. The spring provides a force to a metal ring member in engagement with the corners of the lip seal, the spring force being directed substantially along the axis of the valve stem. The axially directed force of the spring on the ring member creates a radially directed force on the corners of the lips, thereby forcing the outer lip outwardly into engagement with the bonnet and the inner lip inwardly into engagement with the stem. The spring may be held in place by a seal retainer fixed to the bonnet. According to the method of the present invention, the ring member is biased toward the lip seal for forcing th inner and outer lip into the desired sealing engagement, especially under relatively low fluid pressure.

It is a feature of the present invention to provide a valve including a valve body having a fluid inlet, a fluid outlet, and a valve seat, a valve stem passing through and rotatable with respect to the valve body, and a sealing surface rotatable with the valve stem for sealing engagement with the valve seat, the improvement comprising a lip seal position between the valve body and rotatable valve stem for sealing engagement with the valve body and valve stem, a ring member for engagement with the inner and outer lips of the lip seal, and biasing means positioned between the lip seal and sealing surface for applying a substantially axially directed force to said ring member and forcing said outer lip radially outwardly and said inner lip radially inwardly.

It is a further feature of the present invention to provide a method for forming a low pressure seal, comprising positioning a lip seal between the valve body and valve stem, positioning a ring member for engagement with the inner and outer lips of the lip seal, and biasing the ring member toward the lip seal for forcing said inner lip into sealing engagement with said stem and for forcing said outer lip into sealing engagement with the valve body.

It is another feature of the present invention to provide a valve with improved sealing means between the valve body and rotatable valve stem which does not require periodic maintenance.

It is a further feature of the present invention to provide a valve with reliable sealing means between the valve body and valve stem which does not tend to decrease in effectiveness over a period of time.

It is a further feature of the present invention to provide a valve having improved sealing means between the valve body and valve stem capable of providing the desired sealing function over a wide range of temperatures and pressures.

It is a feature of the present invention to provide an improved method for forming a low pressure seal between a valve body and valve stem, wherein the means for biasing the lip seals is not substantially adversely affected by various fluids or fluids under differing temperatures or pressures.

Still another feature of the present invention is to provide a valve with improved sealing means between the valve body and valve stem capable of use in valves having a relatively small spacing between the valve body and valve stem.

It is another feature of the present invention to provide a method for forming a low pressure seal between a valve body and valve stem, wherein a ring member is biased in a direction substantially aligned with the axis of the valve stem to force the lips of the lip seal into sealing engagement.

It is a further feature of the present invention to provide a valve having improved sealing means between the valve body and valve stem, wherein the sealing means is relatively inexpensive to manufacture and install.

These and other features and advantages of the present invention will become apparent from the foregoing detailed description, wherein reference is made to the Figures in the accompanying drawings.

DETAILED DESCRIPTION OF THE INVENTION

Figure 1:
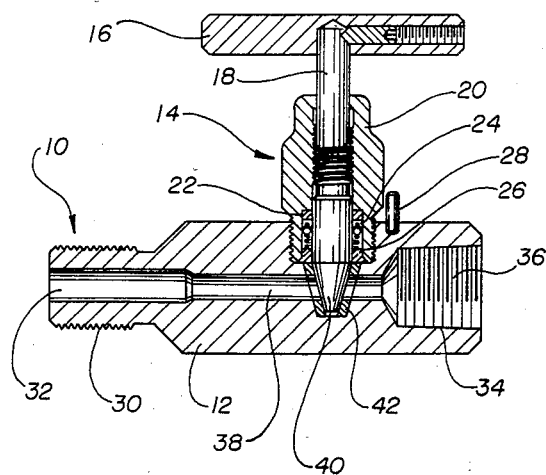
FIG. 1 is a side view, partially in cross-section, of a typical valve according to the present invention with a lip seal between the valve bonnet and valve stem.

Referring to FIG. 1, there is depicted a typical valve 10 including a lip seal according to the present invention. The valve 10 comprises a valve body 12 and a valve stem subassembly 14. The valve body comprises a fluid passageway 38 having a fluid inlet 32 and a fluid outlet 36. Typically, the ends of the valve body are threaded at 30 and 34 for receiving corresponding threads of pipe sections. A portion of the fluid passageway 38 includes a valve seating surface 42 for engagement with the valve stem sealing surface 40 to open or close the valve to fluid flow.

The valve stem subassembly 14 comprises a bonnet 20 which may be threaded to the valve body 12, a rotatable valve stem 18, and a handle 16 for rotating the valve stem. The valve stem 18 may be threaded to the bonnet, so that rotation of the valve stem also causes movement of the valve stem along the axis of the valve stem. The valve stem subassembly also includes thermoplastic back-up ring 22, lip seal 24, and retaining ring 26 which will be discussed subsequently. A pin 28 affixed to the valve body is provided to prevent inadvertent rotation of the bonnet relative to the valve body.

As previously indicated, the valve 10 shown in FIG. 1 is depicted for representative purposes, since the subject of the present invention may be used in many types of valves. As will be readily understood by those skilled in the art, the lip seal 24 is intended to provide sealing engagement between the bonnet 20 and rotatable valve stem 18, so that pressurized fluid does not escape from the valve. Also, the advantages and functional operation of a lip seal compared to other sealing means are widely known, and will not be discussed in detail herein.

Figure 2:
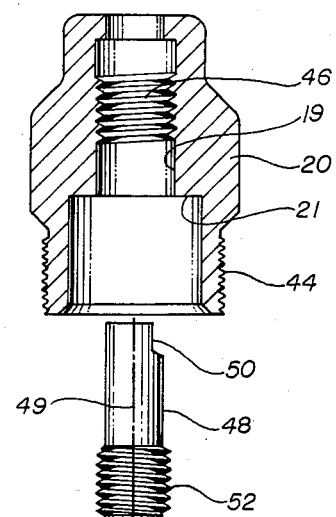
FIG. 2 is an exploded pictorial view partially in cross-section of an alternate embodiment of the valve stem assembly shown in FIG. 1.

FIG. 2 is an exploded view of an alternate valve stem subassembly according to the present invention. It should be understood that the apparatus of FIG. 2 may be used in conjunction with a valve body similar to that depicted in FIG. 1. For ease of explanation, like components will be described with the same numerical references. The bonnet 20 depicted in FIG. 2 includes external threads 44 for threaded engagement with the valve body, and the rotatable valve stem 48 includes a recessed surface 50 for mating engagement with a handle (not depicted), and threads 52 for threaded engagement with the internal threads 46 of the bonnet. As previously indicated, the valve stem 48 both rotates with respect to the valve body and is movable along the axis 49 of the valve stem for moving the sealing surface into and out of engagement with the valve seating surface. According to the apparatus depicted in FIG. 2, a ball member 54 is provided which is secured to the stem 48, and is designed for forming the valve seal with a standard seating surface (not depicted).

A thermoplastic annular back-up ring 22 is provided for engagement with the surface 21 of the bonnet. A plastic lip seal 24 is provided having a surface 56 for engagement with the back-up ring 22, and having an outer annular lip 58 and an inner annular lip 60. A metallic ring member 62 is provided for engagement with the inner and outer lips, with the ends of the ring member forming a small gap 64 which will be discussed subsequently. A spring 66 ground flat at both ends is spaced between the ring member and a retaining member 26, with the lip 72 of the retaining member adapted for engagement with the lower portion of the bonnet 20. If desired, the member 26 may be press fit into the bonnet 20.

Referring now to FIGS. 1 and 2, it should be understood that the spring 66 is held within the valve stem subassembly by the retainer 26. Spring or biasing means 66 supplies a force to the ring member 62; the direction of the force being substantially aligned with the central axis 49 of the valve stem 48. The ring member 62 is shown with a circular sectional configuration, and acts against both the inner lip 60 and outer lip 58, pushing the inner lip 60 inwardly into engagement with the valve stem 48, and pushing the outer lip 58 outwardly into engagement with the bonnet 20. Maintaining close tolerance between the valve stem 48 and the bonnet interior surface 19 may be difficult, and under very high fluid pressures, the plastic lip seal 24 may tend to flow or creep into that space, thus destroying the lip seal. For that purpose, the back-up ring 22 is provided, since close tolerances may be maintained between the ID of the member 22 and the OD of the valve stem to prevent creep of the lip seal 24.

It should be understood that the primary purpose of the spring 66 and ring member 62 is to bias the lips of the lip seal to sealing engagement with the bonnet and valve stem under relatively low fluid pressures. Under higher fluid pressures, the increased fluid pressure acts against these lips to enhance the desired sealing function. Since the spring 66 may provide a fixed axially directed pressure to the ring member 62, it is desirable that fluid be allowed to enter the space between the lips of the lip seal, so that under high pressure desired sealing function will occur. In other words, it is specifically not intended that the metallic ring member 62 come into sealing engagement with the inner and outer lips of the lip member. For that purpose, the gap or passageway 64 is provided for allowing the passage of fluid from the interior of the valve body into the space between the inner and outer lips, so that the lip seal is still pressure-responsive. The passageway 64 may be conveniently formed by not joining the ends of the metallic ring member, so that a very small gap or space exists between the ends of the ring member. Also, the gap 64 of the metallic ring member may allow the ring member 62 to more easily "open" or "close" to conform to the spacing between the inner and outer lips, so that the ring member 62 more uniformingly acts upon both the inner lip and the outer lip throughout at least a substantial portion of the circumference of the inner and outer lips.

In order to increase the desired uniformity of pressure applied to the lip seal 24 by the ring member 62, the end of the spring 66 in contact with the ring 62 preferably is ground flat. There will generally exist a gap between the tip end 68 of the spring and the adjacent surface 67 of the downwardly extending spiral of the spring, the surface 67 being the last surface of the spring in contact with the ring member when proceeding along the spiral of the spring. (For illustrational purposes, this gap between the tip end 68 and the surface 67 is shown in a somewhat exaggerated manner in FIG. 2.) As previously indicated, it is a feature of the present invention to provide as ring-shaped member 62 having a slight gap or open throat portion 64. It is a further feature of the present invention that the tip end 68 of the spring be substantially opposite the gap 64, so that the tip end 68 and the gap 64 are preferably on opposite sides of a hypothetical ring diameter line perpendicular to the hypothetical ring radial line extending from the central axis of the ring 62 and passing through the gap 64. In other words, when assembled, the gap 64 would be on the back side of the valve stem 48, while the tip end 68 of the spring 66 is on the front side of the valve stem 48. This feature of the invention increases the likelihood that the metallic ring member 62 containing the gap 64 will remain in a plane perpendicular to the central axis of the valve stem assembly, even though the ring member 62 is being biased by the spring 66.

It is a feature of the present invention that the force on any portion of the metallic ring member 62 created by the biasing means, such as spring 66, be substantially parallel with the axis of the valve stem. Since the biasing means further acts on at least a substantial portion of not the entirety of the circumference of the ring member 62, it should be understood that the sum of the forces of the biasing means 66 acting upon the ring member 62 will be substantially aligned with the axis of the valve stem and valve stem subassembly. The force created by the biasing means 66 is, of course, not substantially dependent upon the temperature or the pressure of the fluid in the valve body, and in the embodiment as shown in FIG. 2, the biasing force is of a substantially fixed magnitude. It is a feature of the present invention to provide biasing means 66 which will assist the lip seal in maintaining its desired sealing function under relatively low pressure, and for that purpose the biasing means 66 may provide a total force to the spring member 62 in the range of from 3 lbs. to 18 lbs., and preferably in the range of from 10 lbs. to 16 lbs.

Figure 3:
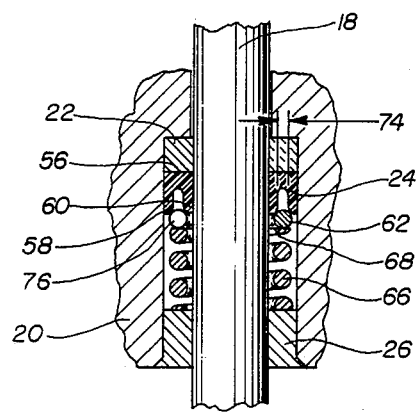
FIG. 3 is a side view of a portion of the apparatus depicted in FIG. 1.

FIG. 3 depicts an expanded view of a portion of the apparatus depicted in FIG. 1. In FIG. 3, it may be seen that the back-up ring 22 maintains close tolerance with the valve stem 18, which prevents or minimizes creep of the lip seal into the space between the bonnet 20 and the stem 18. In FIG. 3, the cross-section for the ring member 62 was taken through the gap 64 so that the end 76 of the ring member is not shown in cross-section. Also, FIG. 3 depicts that the end 68 of the spring in contact with the ring is opposite the end 76 in the ring member, as previously discussed.

The ring member 62 may be easily fabricated with a circular cross-sectional configuration, as shown in FIG. 3. The inner edge of the outer lip 58 and the outer edge of the inner lip 60 may be rounded to increase the radial force being applied to the lips 58 and 60, and thereby decrease the axially directed force being applied to these lips. If the ring member 62 is provided with a circular cross-sectional configuration, it is a feature of the present invention that the diameter of the cross-sectional configuration be greater than the spacing between the inner lip and the outer lip of the lip seal 24 when installed in the valve stem assembly, so that the ring member 62 will not become inadvertently lodged between the lips. As an example, the spacing 74 between the inner and outer lips may be 0.030 inches, while the cross-sectional diameter of the ring 62 is 0.040 inches. Since the ring member is subjected to the pressure of the spring and the plastic lip seal 24 is somewhat elastic, it is preferable to maintain a ratio of the spacing between the inner and outer lips and the cross-sectional diameter of the ring member in the range of from 1:1.2 to 1:3.0.

Figure 4:
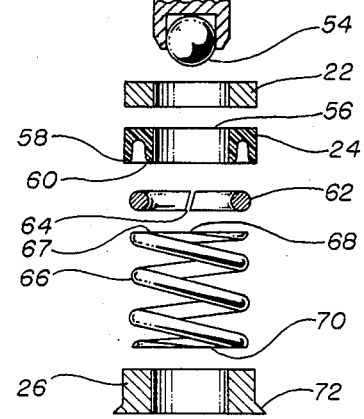
FIGS. 4 and 5 are side views of alternate embodiment of the apparatus depicted in FIG. 3.
Figure 4:
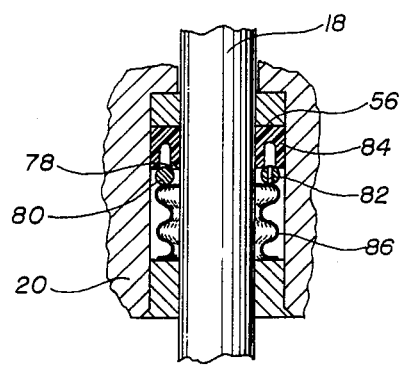

FIG. 4 depicts an alternate embodiment of the present invention. The corners of the lip seal in contact with the ring member 80 need not be rounded, and are shown as having substantially right angles in FIG. 4. If not intentionally rounded, such corners will generally deform into a rounded configuration as shown in FIG. 3 by the force of the spring acting through the ring member, but such nominal deformation does not detract from the operational function of the lip seal. The fluid communication between the space between the inner and outer lips of the lip seal 84 and the interior of the valve body may be provided by forming a small V-shaped notch 78 along the surface of either the inner or outer lips. Thus, the notch 78 allows fluid to pass into the area between the lips by passing between the lip with the notch and the ring member 80. Another embodiment of a possible passageway is shown in FIG. 4, wherein a small aperture 82 is provided through the ring member, so that the ring member may be otherwise solid with joined ends. It is not critical that a coil spring be provided as a biasing means according to the present invention, and FIG. 4 depicts a wave spring 86 which serves as a biasing means acting on the ring member.

It should be understood that the problem of maintaining a low pressure lip seal as solved by the present invention may occur either when the valve is opened to a relatively low line pressure, or during the time when a valve is slowly opened to a high line pressure. In the latter case, of course, the lip seal is first subjected to a relatively low pressure as the valve is cracked open, and is thereafter subjected to an increasing pressure as the valve opens. If the lips of a lip seal do not seal at a low pressure, the fluid pressure differential across the lip seal will not be maintained, and the lip seal will not likely thereafter seal at a higher pressure. Even should the lip seal thereafter seal at the higher pressure, fluid will have escaped in the area of the valve stem, which is an unacceptable condition.

Figure 5:
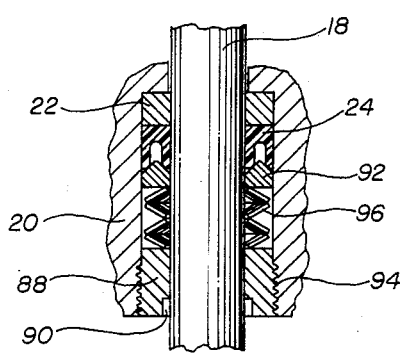

FIG. 5 depicts still another embodiment of the present invention, including the lip seal 24 and spring 66 as previously discussed. The ring member need not have a circular cross-sectional configuration, and FIG. 5 depicts a ring member 92 having a cross-sectional configuration composed of a substantially rectangular base portion and an upper triangular portion. The inner and outer sidewalls of the base portion may be loosely fitted against the OD of the valve stem 18 and the ID of the bonnet, respectively. The sides of the triangular portion would impart a radial force to the inner and outer lips of the lip seal when the ring member 92 were pushed upwardly by the spring 66. Regardless of the cross-sectional configuration of the ring member, the member should be provided with a tapered surface (neither parallel nor perpendicular to the axis of the valve stem) for forcing the lips of the lip seal in a radial direction when the ring member is moved in the axial direction.

FIG. 5 also depicts a bellville washer 96 as the biasing means. Many types of biasing means may be used according to the present invention, although it is desirable that the biasing means apply a relatively uniform pressure to each portion of the ring member. The bellville washer 96 may be a desired biasing means if space between the ring member and retainer is limited, or if a high biasing force on the ring member is desired.

The embodiment as shown in FIG. 5 also includes means for selectively adjusting the force of the biasing means on the ring member, thereby affecting the radial force applied to the lips of the lip seal. Retainer 88 is threaded at 94 for engagement with the corresponding threads on the bonnet 20, is provided with a hexagonal shape to recess portion 90. The valve stem assembly may thus be unthreaded from the valve body with an Allen wrench or other tool used to further screw or unscrew the retainer from the bonnet, thus further compressing or relaxing the biasing means and thereby altering the force of the spring on the ring member 92. If the apparatus as shown in FIG. 5 are not accomplishing the objective of providing a seal member under low pressure, an operator may therefore further thread the retainer to the bonnet to increase the radial force applied to the lip seal.

It should now be understood that the concepts of the present invention are one well adapted for various types of valves, including gate valves, ball valves, plug valves, control valves, safety valves, check valves, relief valves, and regulator valves, whether manually or power controlled. Also, although the concepts of the present invention are well adapted for a valve with both a rotatable and axially movable valve stem, as described herein. It should be understood that the present invention can also be used to seal the area between the bonnet and as valve stem in a valve having a stem which is rotatable but not axially movable during its operation, and in a valve having a stem which is axially movable but not rotatable during its operation.

The present invention may thus be used with any number of valves having valve stems, as shown in the catalog entitled "WKM CATALOG WHS-78" distributed by WKM Wellhead Systems, Inc., as well as a catalog entitled "Gate Valves and Conventional Wellhead Equipment", distributed by Betco Valve Corporation. In particular, however, the present invention is one well adapted for sealing the space between the bonnet and the valve stem for relatively small valves, wherein the spacing between the bonnet and valve stem is relatively limited. It may be understood that the present invention may be preferably used and capable of operating over a wide range of temperatures, pressures, and various materials, since the biasing means, ring member, and retainer will not substantially deteriorate under various conditions. Also, the concepts of the present invention may be incorporated into conventional valves with relatively nominal expense, and will frequently reduced maintenance on the valve. The concepts of the present invention are applicable to valves intended for use with any number of fluids. The term fluid as used herein comprises liquids, gases, and mixtures of liquids and gases.

Each of the components discussed herein with the exception of the lip seal may be fabricated from any number of conventional materials, such as various metals. The lip seal, as previously indicated as widely available in various types of plastics or synthetic materials, such as Ryton TM, Teflon TM, PEEK, or Nylon.

Although the biasing means and ring member are preferably formed from metal, it may be desirable to form the ring member from a relatively hard or inelastic plastic or synthetic material, and the biasing means or spring could also be fabricated from plastic or other non-metallic material. As indicated earlier, the present invention has been described in terms of a valve having a valve body and a bonnet threaded, bolted, or otherwise fixed to the valve body for receiving the valve stem. Although the use of a valve body in a separate bonnet is widely known in the art, it should be understood that many valve body assemblies do not include a separate bonnet, and the valve stem simply passes through a portion of the overall valve body. Thus, the present invention is applicable to both valves with and without a bonnet as disclosed herein.

Other alternative forms of the present invention will suggest themselves from consideration of the apparatus and techniques herein discussed. Accordingly, it should be fully understood that the methods and apparatus described herein and shown in the accompanying drawings are intended as exemplary embodiments of the invention, but not as limitations thereto.

What is claimed is:

1. A valve including a valve body having a fluid inlet and a fluid outlet, a valve seat, a valve stem having a central axis movable with respect to said valve body, and a sealing surface movable with said valve stem for sealing engagement with said valve seat, the improvement comprising:

an annular lip seal positioned between said valve body and said stem, said lip seal having an inner lip for sealing engagement with said stem, an outer lip for sealing engagement with said valve body, and an annular spacing between said lips for receiving fluid pressure from with said valve body to urge said lips into sealing engagement with stem and valve body;

a metallic ring member for engagement with lip ends of both said inner lip and said outer lip of said lip seal; and biasing means positioned between said ring member and said sealing surface for applying a force to said ring member substantially directed along said valve stem axis and for biasing said lip end of said outer lip radially outwardly into sealing engagement with said valve body and biasing said lip end of said inner lip radially inwardly into sealing engagement with said stem.

2. The apparatus as defined in claim 1, further comprising:

a back-up ring formed from a thermoplastic material and spaced between said bonnet and said lip seal for limiting movement of said lip seal under high fluid pressure.

3. The apparatus as defined in claim 1, further comprising:

a retainer spaced between said biasing means and said sealing surface for retaining said biasing means in engagement with said ring member; and said retainer is positionable relative to said ring member for selectively altering the force applied by said biasing means to said ring member.

4. The apparatus of claim 1, wherein said ring member has a circular cross-sectional configuration, and the ratio of the spacing between said outer lip and said inner lip and the diameter of said circular cross-sectional ring member is in the range of 1:1.2 to 1:3.0.

5. The apparatus as defined in claim 1, wherein said biasing means is a coil spring which applies a substantially axially directed pressure to said ring member in the range of between 3 lbs. to 16 lbs.

6. The apparatus as defined in claim 3, wherein said valve body includes a fluid passageway portion and a valve bonnet portion removable from said fluid passageway portion;

said fluid passageway portion includes a cylindrical-shaped aperture in fluid communication with fluid pressure within said fluid passageway portion and having a uniform cross-section for receiving said retainer, said biasing means, said ring member, and said lip seal.

7. The apparatus as defined in claim 1, wherein said ring member has a circular cross-sectional configuration, and said ring member has adjacent ends forming a fluid passageway into said spacing formed between said inner lip and said outer lip.

8. The apparatus as defined in claim 5, said ring member including a fluid passageway to prevent sealing engagement between said ring member and said lip seal, and the end of said coil spring in engagement with said ring member terminates at a location not substantially adjacent said fluid passageway.

9. The apparatus as defined in claim 1, wherein a portion of said inner lip includes a fluid passageway to prevent sealing engagement between said ring member and said lip seal.

10. A valve stem sub-assembly, comprising:

a valve bonnet for fixed engagement with a valve body;

a valve stem rotatable with respect to said valve bonnet;

an annular lip seal positioned between said valve bonnet and said stem, said lip seal having an inner lip for sealing engagement with said stem, an outer lip for sealing engagement with said valve bonnet, and an annular spacing between said lips for receiving fluid pressure to urge said lips into sealing engagement with stem and valve bonnet;

a ring member for engagement with both said inner and outer lips of said lip seal;

biasing means for applying force to said ring member for biasing a lip end of said outer lip radially outwardly into sealing engagement with said bonnet and biasing a lip end of said inner lip radially inwardly into sealing engagement with said stem; and retaining means for retaining said biasing means in engagement with said ring member.

11. The subassembly as defined in claim 10, further comprising:

a back-up ring formed from a thermoplastic material spaced between said bonnet and said lip seal for limiting movement of said lip seal under high fluid pressure.

12. The subassembly as defined in claim 10, wherein said retainer is positionable relative to said ring member for selectively altering the force applied by said biasing means to said ring member; and said biasing means is a coil spring.

13. The subassembly as defined in claim 10, wherein said ring member has a circular cross-sectional configuration, and said ring member has adjacent ends forming a fluid passageway into said spacing formed between said inner lip and said outer lip.

14. The subassembly as defined in claim 10, said ring member including a fluid passageway to prevent sealing engagement between said ring member and said lip seal, and the end of said coil spring in engagement with said ring member terminates at a location not substantially adjacent to said fluid passageway.

15. A method for forming a seal between a valve body and a rotatable valve stem, comprising:

positioning an annular lip seal between said valve body and said valve stem, said lip seal having an outer lip, an inner lip, and an annular spacing between said lips;

positioning a ring member having a tapered cross-sectional configuration for engagement with lip ends of said outer lip and said inner lip of said lip seal;

biasing said ring member toward said lip seal for forcing said lip end of said inner lip radially inwardly into sealing engagement with said stem and for forcing said lip end of said outer lip radially outwardly into said sealing engagement with said valve body; and forming a fluid passageway between said valve body and said annular spacing between said lips for transmitting fluid pressure to urge said lips into sealing engagement with said valve body and said valve stem.

16. The method as defined in claim 15, further comprising:

positioning a thermoplastic back-up ring between said valve body and said lip seal for limiting movement of said lip seal under high fluid pressure.

17. The method as defined in claim 15, further comprising:

forming said ring member in a substantially circular cross-sectional configuration having a diameter in the range of 20% to 200% greater than the spacing between said outer lip and said inner lip.

18. The method as defined in claim 15, further comprising:

forming said fluid passageway between adjacent ends of said ring member.

19. The method as defined in claim 18, further comprising:

selectively adjusting the force exerted on said inner and outer lips by said ring member.

20. The method as defined in claim 19, wherein said biasing means is a coil spring, and the end of said coil spring in engagement with said ring member terminates at a location not substantially adjacent to said ends of said ring member.

* * * * *